United States Patent [19]
Konstanzer et al.

[11] Patent Number: 5,642,025
[45] Date of Patent: Jun. 24, 1997

[54] PROCESS AND APPARATUS FOR THE REDUCTION OF SURGES IN SWITCH-ON CURRENT IN THE OPERATION OF A ROTARY CURRENT LOAD

[75] Inventors: Michael Konstanzer; Stefan Freitag, both of Freiburg, Germany

[73] Assignee: Fraunhofer Gesellschaft zur Forderung der angewandten Forschung e.V., Munich, Germany

[21] Appl. No.: 203,374

[22] Filed: Mar. 1, 1994

[30] Foreign Application Priority Data

Mar. 9, 1993 [DE] Germany .................. 43 07 291.7

[51] Int. Cl.[6] ................................................ H02K 17/02
[52] U.S. Cl. ............................................ 318/778; 318/254
[58] Field of Search ............................ 318/254, 138, 318/439, 778–784, 807–817; 323/321, 238

[56] References Cited

U.S. PATENT DOCUMENTS

| 3,891,905 | 6/1975 | Müller | 318/254 |
|---|---|---|---|
| 4,057,842 | 11/1977 | Bauman et al. | 323/321 |
| 4,065,706 | 12/1977 | Gosling et al. | 318/254 |
| 4,072,880 | 2/1978 | Oshima et al. | 318/227 |
| 4,131,927 | 12/1978 | Tsuchiya et al. | 361/6 |
| 4,348,605 | 9/1982 | Török | 318/701 X |
| 4,408,244 | 10/1983 | Weible | 318/784 X |
| 4,763,347 | 8/1988 | Erdman | 318/254 |
| 5,003,242 | 3/1991 | Liber | 318/778 |
| 5,151,642 | 9/1992 | Lombardi et al. | 318/779 |
| 5,450,001 | 9/1995 | Konstanzer | 323/238 |

*Primary Examiner*—Brian Sircus
*Attorney, Agent, or Firm*—Antonelli, Terry, Stout & Kraus, LLP

[57] ABSTRACT

A method for reduction of switch-on surges while operating an inductive rotary current load is described, having a magnetizable core and three windings arranged in different connection patterns to a rotary current alternating network. A phase angle control unit provides at least a temporary phase operation of the voltages between the lines of the windings. The arrangement includes core sectors allocated to a winding being brought to pre-determined state of magnetization, at least two of three voltages between the lines of the windings having unipolar voltage halfwaves reduces to at least half their voltage-time surface being connected successively to the rotary current load according to the present phase shift of the voltages between the lines. After at least the duration of a length of one period of the last applied voltage between the lines, one of the three voltages having an effective value raised to one desired value or up to the nominal value of the remain voltage remaining switched on and then the other two phases also having a raised effective value being switched on in sequence.

12 Claims, 8 Drawing Sheets

PROCESS AND APPARATUS FOR THE REDUCTION OF SURGES IN SWITCH-ON CURRENT IN THE OPERATION OF A ROTARY CURRENT LOAD

BACKGROUND OF THE INVENTION

The present invention relates to a process and an apparatus for the reduction of switch-on surges in the operation of an inductive rotary current load provided with a magnetizable core having three windings arranged selectively in different connection groups on a rotary alternating current network, with at least a temporary phase operation of the voltages between the lines being provided.

In the operation of inductive loads, a magnetic remanence or a remanent induction remains in the magnetizable core after a switching off of a current. This magnetic remanence or remanent induction can be differently poled depending on the clarity of the alternating voltage at the switching-off point and may also have different values.

When switching on inductive loads, their remanence is usually unknown, and a high surge in a switch-on current occurs especially, e.g., in transformers having high induction and few air gaps, if the switch-on time point is unfavorable to the present remanence relative to the sequence of the alternating voltage. This switch-on surge can, under circumstances, amount to fifty times the nominal current and can lead to a tripping of safety components. These high currents are the result of the magnetization being driven far into saturation as a consequence.

For this reason, the induction must be reduced to such an degree that the switch-on current does not exceed a predetermined limit even in the most unfavorable event. This, however, requires considerably more iron in the core, e.g., of a transformer, while maintaining the same nominal power, making the core correspondingly larger and more expensive, which has negative effects, particularly, in high-power transformers.

Switching one of the three voltages between the lines to the respective winding, and thereby enlarging the voltage-halfwave phase angle is already known from PCT/DE91/00216. Simultaneously with a measurement of the reactive current, a magnetizing current ensues. This measurement of the reactive current monitors the operational state at which the magnetization of the core reaches saturation.

This switching-on process has proven itself, but it demands measurement of the current and requires devices for evaluating the measurement and for the respective control of the correcting components. Moreover, a relatively complex and expensive follow-up control must be provided, because after flowing current through one of the windings by switching on one voltage between the lines, the other voltages have to be switched on following a predetermined period of delay in correct sequence until magnetic saturation is reached. The circuit is, therefore, very complex.

Attempts have already been made to conduct this switch-on process without measuring the current and with an effective voltage that has been reduced to a fixed value. In this case, the core is premagnetized by applying one of the three voltages between the lines. However, it turns out that an effective reduction of the switch-on current surge is greatly dependent on the loading and on the quality of the inductive load so that changing and adapting the switch-on process has to be carried out in dependence on the connected, inductive load and, e.g., in the case of a rotary current transformer also in dependence on its secondary load. However, this is complicated and prevents universal use.

SUMMARY OF THE INVENTION

The object of the present invention is to create a process of the type mentioned in the introduction as well as an apparatus with which a rotary current load can be switched on even in the case of varying load conditions and different designs of the rotary current load with an at least considerably reduced, preferably practically negligible, surge in switch-on current.

In order to solve this object, it is proposed, in particular, in accordance with the present invention that the core sectors allocated to a winding are brought to a predetermined magnetization; that for this purpose, at least two of the three voltages between the lines having unipolar voltage halfwaves with voltage-time surfaces reduced at least to approximately half are connected successively according to the present phase shift of the voltage between the lines to the rotary current load; that following at least the duration of the length of one period of the last applied voltage between the lines, one of the three voltages between the lines having an effective value increased up to a desired value or up to the nominal value of the mains voltage remains connected; and that then the other two phases also having increased effective value are connected in sequence.

In this switch-on process at least two of the three voltages between the lines are switched on in such a manner that practically all the iron of the core can be premagnetized thereby in such a manner that undesirable demagnetization in the gaps when the current flows does not occur. In this way, a defined state of premagnetization of the core can be achieved which serves as the initial state for switching higher, respectively, connection to the, e.g. full main voltage, can be achieved. This process Dermits, in particular, also switching on the inductive lead quickly to the main voltage. In this process, it is not necessary to measure the magnetized current in order to determine the state of magnetization, and complexity is thereby reduced.

If the unipolar voltage impulses or halfwaves whose effective values were reduced are continually transmitted to the rotary current lead in the prescribed manner, a magnetization pattern having periodically recurrent states of magnetization is created following at least the duration of one length of the last period of applied voltage between the lines, so that after this magnetization pattern has been achieved, it is possible to fully switch on at any time directly following an application of reduced voltage of one phase, commencing with it.

This solves the problem that when one sector of the core allocated to one winding is premagnetized, the states of magnetization of the other two also change. The theoretical conditions of a single-phase, inductive load cannot be transferred to the rotary current load, because during the rotary current load not all the core sectors can be simultaneously led into maximum remanent magnetization. For this reason, a magnetization pattern is created, and knowing the present, different and recurrent magnetization in the three core sectors, it is switched on accordingly. Thus, undesirable excess current upon switching on can be effectively prevented in this manner.

The unipolar voltage halfwayes with reduced voltage-time surfaces can be decreased in one sector corresponding to a phase angle of 135° down to approximately 90° with approximately sinus-shaped mains voltage. In particular, if rotary transformers are the inductive load having secondary loading, relatively small voltage impulses, respectively current impulses, suffice to magnetize the core to a defined output remanence.

A reduction of the unipolar voltage halfwaves to an effective value corresponding to a phase angle of 90° has turned out to be universal.

According to an embodiment of the present invention, the magnetization, respectively the premagnetization of three core sectors is carried out with a magnetic flux in the same direction, respectively of a rectified magnetic flux, in at least two of the core sectors. By this measure, a defined remanence is already achieved following the duration of one length of the period of the last applied voltage between the lines.

Preferably, in the case of delta-connected windings arranged side by side on an iron core, current is succesively flowed first through the windings arranged on the outer limbs and then the winding arranged on the center limb. As a result of this sequential magnetization, premagnetization is largely independent of the load situation and is even possible with asymmetrical loads and, therefore, permits switching on without current peaks.

Especially advantageous is if during the premagnetization phase the effective voltages applied to the windings are increased from the switching-on point to an effective voltage corresponding to unipolar voltage halfwaves phase operated at approximately 90°. With this measure, which is easy to realize due to the phase angle control for the reduction of the voltage effective value which is usually already present, small excess currents, under circumstances, otherwise still occurring in the premagnetization phase, can be avoided.

Delta-connected windings of a rotary current load and arranged side by side, in particular, on an iron core and delta-connected windings permit a simplified premagnetization process with the connection of two voltages between the lines. In this case if the windings are arranged, e.g., on an iron core and are joined in a delta connection, the respective voltages between the lines having homopolar, unipolar voltage halfwaves with their voltage-time surfaces reduced at least to half are applied sequentially to the outer windings. Then following the duration of at least one length of period of the last applied voltage between the lines, one of the two voltages between the lines following one of these voltage halfwaves having, if need be, a reduced effective value, respectively of a reduced current-flow angle remains switched on and the other two voltages between the lines also having, if need be, a reduced current-flow angle, respectively of a reduced effective value, are connected in sequence.

Switching on only two voltages between the lines during the premagnetization phase decreases the overall complexity of the control and also reduces the number of servo components, because only two servo components need to be provided, whereas the third phase can be directly connected.

Another embodiment of the present invention provides that, in order to premagnetize the core to predetermined values, if the windings are selectively star or delta connected on the primary side, all three voltages between the lines are successively connected, when the mains are switched on, to their respective allocated windings unipolar and with a reduced effective value according to the present phase shift, and that, following the duration of at least the length of one period of the last applied voltage between the lines, one voltage between the lines following one of these voltage halfwaves having, if need be, a reduced effective value, respectively of a reduced current-flow angle, remains switched on and the other two voltages between the lines also having, if need be, a reduced current-flow angle, respectively of a reduced effective value, are connected in sequence.

With this switch-on process, primary windings of an inductive rotary current load joined in either star or delta connections can be universally connected to the main practically without any switch-on current surge.

The present invention relates also to an apparatus for limiting the surge in the switch-on current of an inductive rotary current load provided with a magnetizable core, in particular, of a rotary current transformer. The apparatus has servo components linked to a phase angle control and designed as alternating current switches in the phase branches. This apparatus is particularly distinguished by servo components being provided in at least two phase branches and by these servo components as well as the phase angle control being connected to a sequence control, for switching on and switching off the servo components of the premagnetization of the core sectors to predetermined values for following correct switching on the servo components and for triggering the phase angle control in the sense of a change in the phase angle from approximately 135° to approximately 90° during the premagnetization to smaller phase angles in the next phase of operation. This apparatus permits switching on an inductive load practically independently of its load state without excess current peaks in a simple manner.

Additional embodiments of the present invention are described in the the description and claims which follow. The invention with its essential details is made more apparent in the following using the drawings.

DETAILED DESCRIPTION OF THE PREFERRED EMBODIMENT(S)

Figure 1:
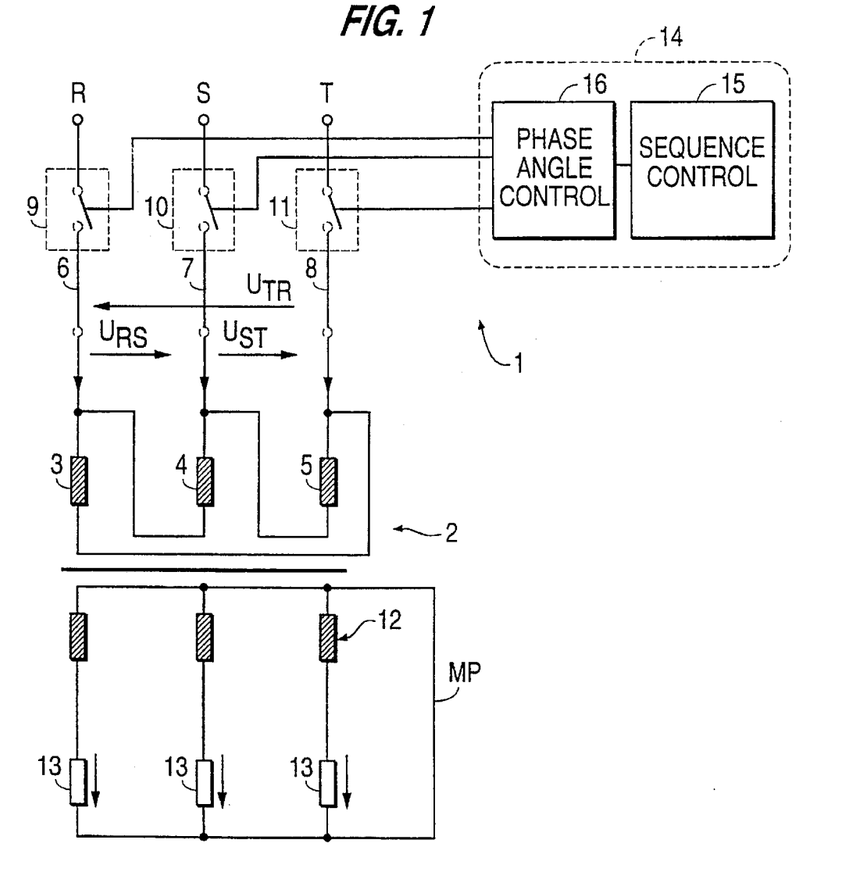
FIG. 1 shows a basic representation of an apparatus for limiting a surge in a switch-on current having a sequence control and a phase angle control connected to servo components as well as a rotary current transformer connected to the apparatus.

FIG. 1 shows a diagrammatic representation of an invented apparatus 1 in conjunction with a rotary transformer 2 connected in a connection group. On the primary side, this transformer 2 has its windings 3, 4, 5 joined in a delta connection. In each phase conductor 6, 7, 8 connected to the phases R S T is a servo component 9, 10, 11 each symbolically represented by a switch. In order to distinguish the voltages between the lines, voltage arrows $U_{RS}$, $U_{ST}$ and $U_{TR}$ are drawn with respect to the phase conductors.

On the secondary side, the transformer 2 has its secondary windings 12 joined in a star connection with a center point conductor MP. Also discernible are load resistances 13 connected against the center point conductor MP. The servo components 9, 10, 11 are connected to a control 14 which essentially contains a sequence control 15 as well as a phase angle control 16. In this way, the servo components 9, 10, 11 can be controlled in such a manner that different current-flow angles and also switching sequences can be realized. In a practical embodiment, the servo components are triacs, thyristors or a combination of electro-mechancial switches and semiconductor switches. In particular, in the latter case, the current flows through the semiconductor switches in a premagnetization phase having reduced current, whereas when the transformer is fully connected to the main, these semiconductors are bridged by mechanical contacts, i.e., by way of illustration, a connector.

Figure 2:
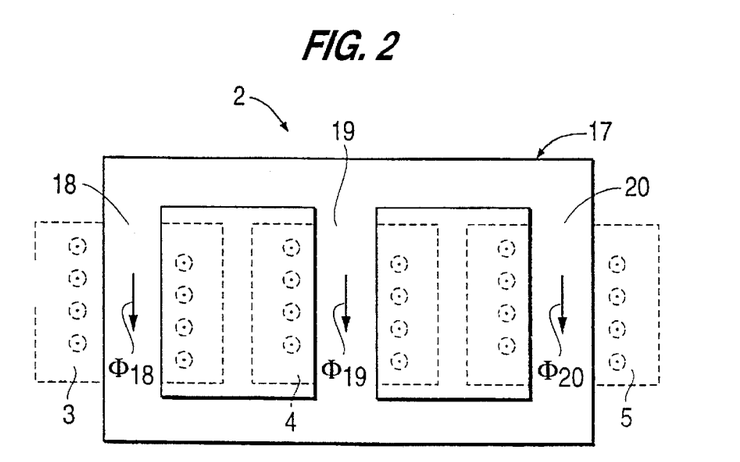
FIG. 2 shows a diagrammatic representation of a three-limb rotary current transformer.

FIG. 2 shows diagrammatically the design of a rotary current transformer 2 having a three-limb iron core 17 and primary windings 3, 4, 5 located on each limb 18, 19, 20. The drawn winding direction of the primary windings yields a magnetic flux $\Phi$, marked by an arrow, in the iron core limbs 18, 19, 20.

In order to avoid a high surge of switch-on current (inrush) when switching on, by way of illustration within the rotary current transformer 2 shown in FIG. 1, the three voltages between the lines are connected successively unipolar and with a reduced effective value to the primary windings 3 to 5 according to the phase shift present. The phase angle control permits setting a phase angle from approximately 135° to 90°. Unipolar means in this case that of the cut voltage halfwaves of either only the positive halfwaves, or only the negative halfwaves are connected to the windings.

This application of reduced voltage, respectively current, to the primary windings results in a premagnetization of the iron core 17, with the limbs 18, 19, 20 of the core assuming certain states of magnetization which recur periodically after a brief time. After attaining this magnetization pattern having periodically recurring states of magnetization in the individual limbs, the transformer can be fully switched on according to a sequence prescribed by control 14 without the occurrence of excess currents.

Figure 3:
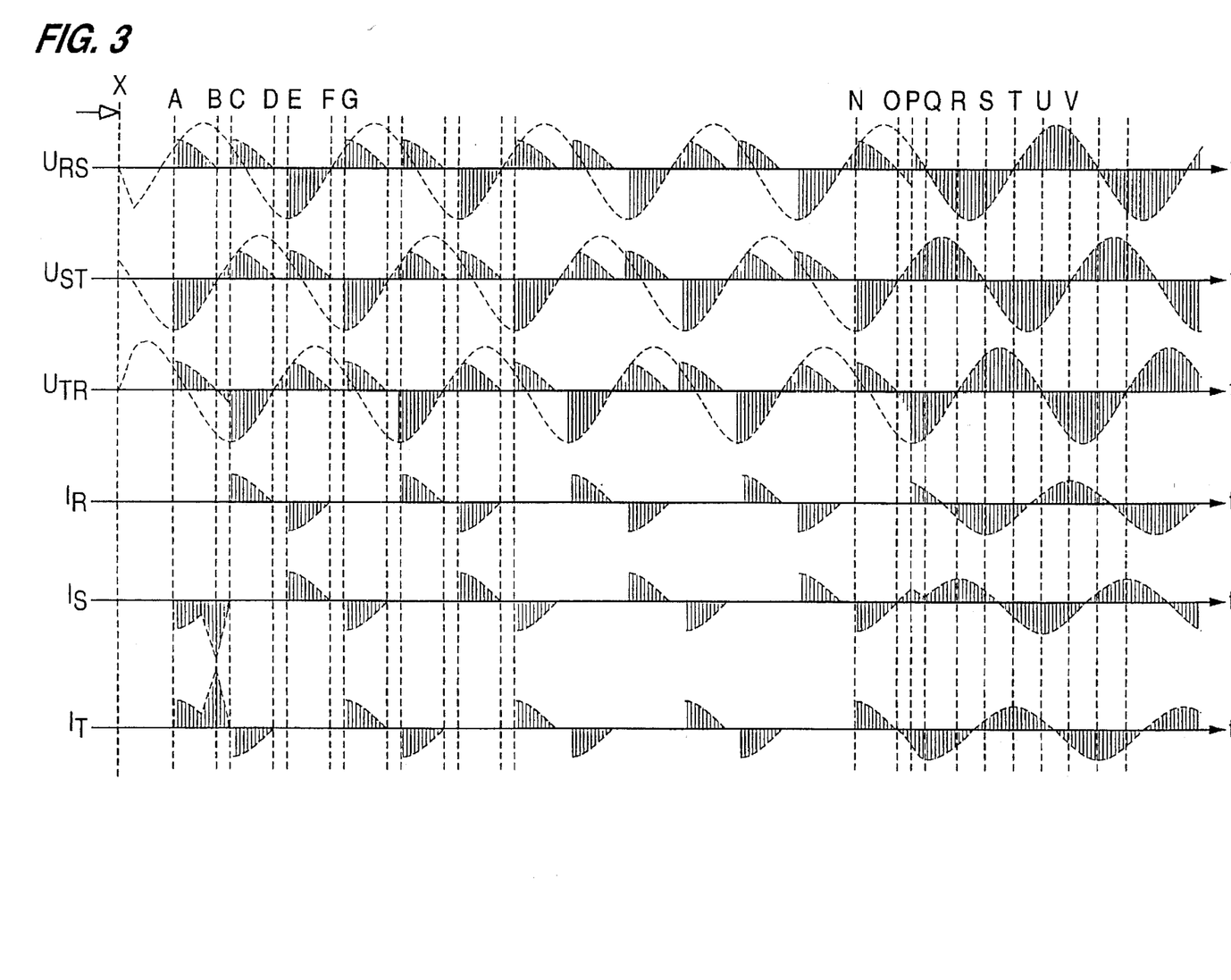
FIG. 3 shows a diagram with a representation of rotary current voltages between the lines with the respective current.
Figure 4:
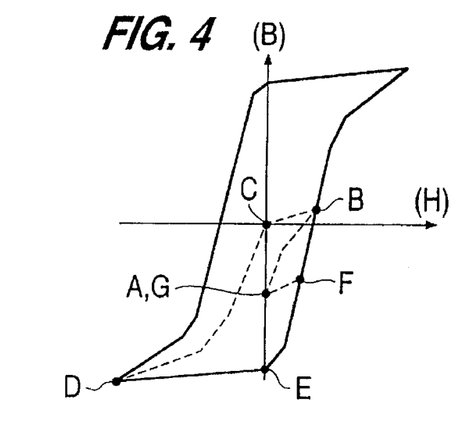
FIGS. 4–9 show the magnetic hysteresis curves for the respective limbs of a rotary current transformer.
Figure 5:
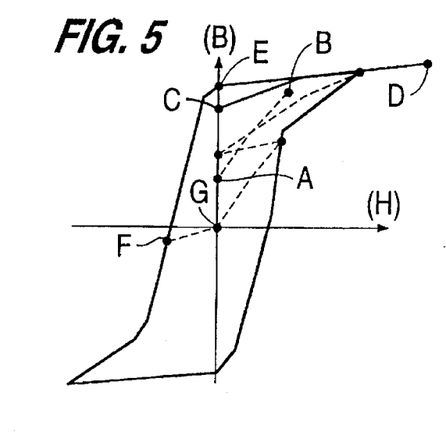
Figure 6:
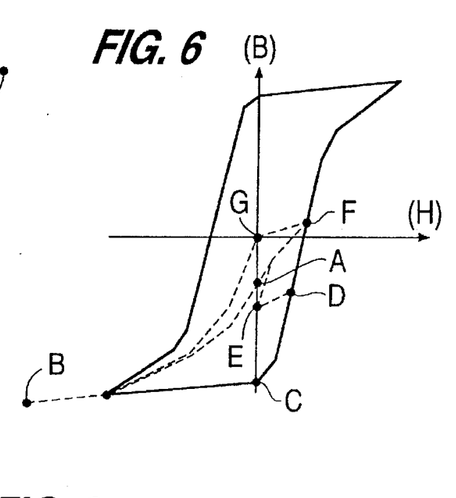
Figure 7:
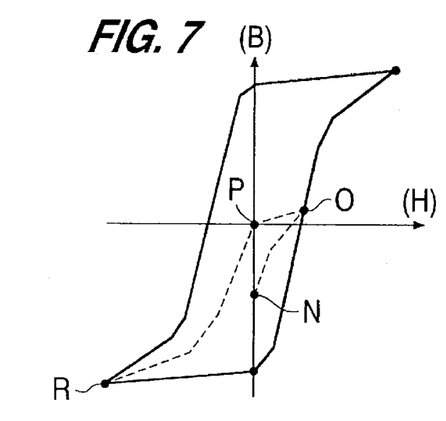
Figure 8:
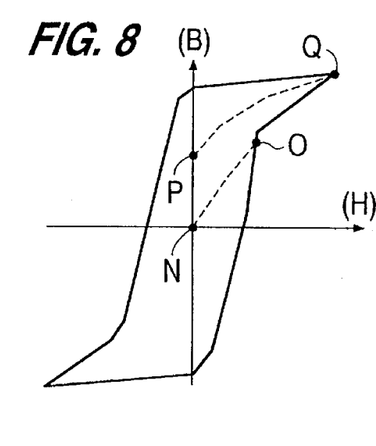
Figure 9:
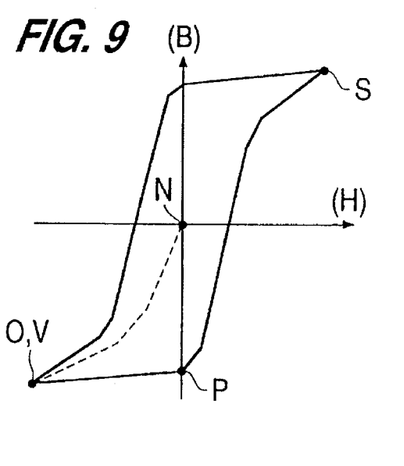

In the switch-on process shown in FIGS. 3 to 9, a set current flow angle, respectively a phase angle of approximately 90° is provided. The sequence of this switch-on process relates to a rotary current transformer having primary side delta-connected windings as in the case of the transformer of FIG. 1. For the premagnetization phase, the respective magnetizations in the individual limbs of the iron core (cf. FIG. 2) are depicted in the diagrams of FIGS. 4 to 6, whereas the magnetization courses of FIGS. 7 to 9 are yielded when fully switched on to the main alternating voltage. The individual hysteresis curves are correspond in groups to the limbs of the iron core. Thus FIGS. 4 and 7 relate to limb 18, FIGS. 5 and 8 to the center limb 19 and FIGS. 6 and 9 to limb 20 of the iron core.

Prior to switching on the transformer, the state of the remanent induction in the three limbs of the transformer is chance and random. In the three hysteresis curves of FIGS. 4 to 6, these remanences are marked A. This also corresponds to the time point A in FIG. 3, where the voltage between the lines $U_{ST}$ is connected to the transformer at an angle of 90°. In the preferred embodiment, initially only the respective negative, cut halfwave of the main alternating voltages are permitted to pass. However, the reverse is just as possible and only the respective positive, cut voltage halfwave is permitted to pass.

The voltage $U_{ST}$ with a reduced effective value now drives a current through the winding 5 of the rotary current transformer, thereby generating a magnetic flux $\Phi_{20}$ in limb 20. The reduced voltage brings the remanent induction present at A via joint B to point C of the hysteresis curve (cf. FIG. 6). Although point B already lies in the saturation region of the induction, only a small reactive current peak occurs in conductor S, respectively conductor T, due to the voltage between the lines $U_{ST}$ with reduced effective value. The timepoint B is the voltage crossover of the voltage between the lines $U_{ST}$. Until timepoint C (cf. FIG. 3), the remanence in limb 20 has returned to the stationary point C. On its way through the iron core of the transformer, the magnetic flux $Phi_{20}$ generated at the timepoint A divides into two partial fluxes through the limbs 18 and 19. The voltages induced in this manner are measured at the voltages between the lines $U_{RS}$ and $U_{TR}$ not being applied. In the case of voltage between the lines $U_{RS}$, the induced voltage of the winding 4 is measured and in the case of voltage between the lines $U_{TR}$, the induced voltage of the winding 3. The magnetic partial fluxes in limbs 18 and 19 run in opposite direction to the magnetic flux $Phi_{20}$. In limb 19, the partial flux results in shifting the remanence toward positive values. Thus in FIG. 5, the magnetic induction is moved from starting point A via point B (corresponding to timepoint B in FIG. 3) to stationary point C corresponding to timepoint C. In limb 18, the partial flux also results in a shift of the remanence toward positive values, according to FIG. 4 from starting point A via point B to point C. In FIG. 3, it can be readily seen that the amplitudes of the voltages $U_{RS}$ (1st line of the diagram) and the voltage $U_{TR}$ (3rd line of the diagram) are half as big as the voltage $U_{ST}$ due to the series connection of the winding 3 and 4 upon application of voltage $U_{ST}$. The currents $I_R$, $I_S$ and $I_T$ are drawn in the 4th, 5th and 6th line of the diagram. $I_R$ is the current through windings 3 and 4, current $I_S$ is the current through windings 4 and 5, and current $I_T$ is the current through windings 3 and 5. In the 5th and 6th line, the reactive current peak occurring at timepoint B is visible, which occurs if the magnetic induction reaches saturation at point B (FIG. 6) via the negative point of reversal of the hysteresis curve. As soon as the reactive current peak between the timepoints B and C (FIG. 3) has let up, the servo components 10 and 11 are locked and the voltage $U_{ST}$ is switched off in this manner.

At the timepoint C, the servo components 9 and 11 are then made conductive in such a manner that the voltage between the lines $U_{TR}$ is applied unipolar with a halfwave cut at 90° at the transformer. This voltage drives a current through winding 3. The current flowing through this winding 3 generates a negative, magnetic flux $\Phi_{18}$. The magnetic flux $\Phi_{18}$ causes the remanence in limb 18 to move from point C via point D into point E. These states of magnetization again correspond to the timepoints bearing the same letters in the diagram of FIG. 3. As the remanent induction in limb 18 lies in the center point of the hysteresis curve (FIG. 4), the phase angle of the negative halfwave, on the other hand, lies at 90°, the magnetic induction is also led accordingly up to the negative point of reversal D of the hysteresis curve so that no reactive current peak occurs.

The magnetic flux $\Phi_{18}$ generated in limb 18 also divides into two partial fluxes of approximately the same size through limbs 19 and 20. In limb 19, the remanence moves in the hysteresis curve (FIG. 5) from point C via point D to point E. Although point D lies in the saturation region of the iron in limb 19, no measureable reactive current peak occurs due to the serial switching of windings 4 and 5 (cf. FIG. 3, diagram lines 4 and 6). From point D (FIG. 5) magnetization wanders to point E into the stationary remanence. The partial flux of magnetic flux $\Phi_{18}$ in limb 18 causes the magnetization in limb 20 to move from point C (cf. FIG. 6) via point D to point E. If the magnetic state is that of point D, also corresponding to timepoint D in FIG. 3, the servo components 11 and 9 are locked. Voltage is no longer applied to the transformer. At timepoint E, the voltage between the lines $U_{RS}$ is applied to the transformer by triggering servo components 9 and 10.. As in the other two voltages between the lines this occurs with unipolar voltage halfwaves cut at 90°. At timepoint E the remanent inductions of the iron of the three limbs is located at points E of the corresponding hysteresis curves according to FIGS. 4 to 6. The current through winding 4 generates a magnetic flux $\Phi_{19}$ in limb 19. This flux $\Phi_{19}$ moves the remanence in limb 19 from point E via point F to point G (FIG. 5). The division of the flux $\Phi_{19}$ into two partial fluxes flowing through limbs 18 and 20 moves the remanence in limb 18 via point F to point G. This point coincides again with point A, by chance the present starting remanence, (FIG. 1). In limb 20, the remanence also moves from point E via point F to point G (FIG. 6).

From timepoint G (FIG. 3)on, previously described states of magnetization recur periodically in the three limbs. To make this more apparent, the courses of the voltages and currents are, therefore, shown over 3 period lengths. In this region, a switch-on of the three voltages between the lines continues to occur successively with unipolar voltage halfwaves cut at 90°.

The transition to switching the rotary current transformer 2 on fully to the rotary current mains begins from timepoint N (FIG. 3) on. As previously mentioned, at timepoint G, the states of magnetization in the three limbs 18, 19, 20 are already in a state suited for full switch. Accordingly, timepoint N can also be returned to timepoint G.

In order to make this more apparent, the states of magnetization in the individual limbs during the transition phase from premagnetization to full switching on are shown in the hysteresis curves in FIGS. 7 to 9. These are assigned, like the hysteresis curves of FIGS. 4 to 6, analogue to the limbs 18, 19 and 20. The starting point N in the hysteresis curves of FIGS. 7 to 9 corresponds to the remanent magnetization point G in the FIGS. 4 to 6. The corresponding timepoints are again shown using the same letters as in the diagram of FIG. 3.

At the timepoint N, the voltage between the lines $U_{ST}$ is applied by triggering and closing the servo components 10 and 11. Due to the magnetic flux generated in limb 20, the magnetization in this limb passes via the negative point of reversal O of the hysteresis curve (FIG. 9) to point P. The negative point of reversal O lies at the voltage crossover from the negative to the positive voltage halfwave of the voltage between the lines $U_{ST}$. Up to the timepoint P (FIG. 3), the state of magnetization wanders to point P (FIG. 9) and thus is located in the maximum possible negative remanence.

Due to the yielded magnetic partial fluxes, the magnetizations in the limbs 18 and 19 are also moved in each case from points N via points O to points P (FIGS. 7 and 8). At timepoint P, the voltage between the lines $U_{ST}$ is now not switched off, but rather the two servo components 10 and 11 (FIG. 1) remain conductive. A phase angle is not longer present from timepoint P on relative to the voltage between the lines $U_{ST}$. The voltage between the lines $U_{ST}$ therefore continues to drive a current through winding 5 which generates a magnetic flux $\Phi_{20}$ in limb 20. Due to this magnetic flux magnetization wanders in limb 20 from point O at timepoint O (FIG. 3) via point P to the positive point of reversal S of the hysteresis curve of FIG. 9. With the next negative full-halfwave of the voltages between the lines $U_{ST}$, the magnetization runs through the top branch of the hysteresis curve shown in FIG. 9 back to the negative point of reversal, now bearing the letter V in FIG. 9 corresponding to the timepoint V in FIG. 3 and coincides with the timepoint O. The path between the points of reversal in the hysteresis curve is always covered between two voltage crossovers from negative to positive point of reversal during the positive voltage halfwave and from positive to negative point of reversal during the negative voltage halfwave. For permanent operation, the magnetization of the limb, therefore, circulates from the beginning of the full switch-on (timepoint O) on the hysteresis curve.

At timepoint P, the servo component 9 is also triggered and made conductive so that from this timepoint on not only the voltage between the lines $U_{ST}$, but also the two other voltages between the lines $U_{RS}$ and $U_{TR}$ are connected.

A phase jump occurs in the conductor currents as soon as all three voltages between the lines are applied to the transformer, because the conductor currents no longer correspond to the strand currents, but rather the conductor currents are each the sum of two strand currents. The switched in voltage between the line $U_{TR}$ at the timepoint P moves the magnetization in the limb 18 from point P (FIG. 7) to the negative point of reversal R of the hysteresis curve. R corresponds to the timepoint R and is the crossover from negative to positive voltage halfwave of the voltage between the lines $U_{TR}$. Thus, for limb 18, too, magnetization coincides with the course of the voltage of the voltage between the lines $U_{TR}$ in such a manner that the hysteresis curve always is traversed once in one direction between the crossovers of this voltage between the lines.

At the timepoint P, magnetization of the limb 19 is located at the stationary point P (FIG. 8). The positive voltage sector of the voltage between the lines $U_{RS}$ between timepoints P and Q (FIG. 3) moves magnetization from point P to point Q, the positive point of reversal of the hysteresis curve of FIG. 8. The state of maximum magnetization Q in the center limb 19 coincides with the crossover of voltage between the lines $U_{RS}$ from the positive to the negative halfwave. For the next halfwaves, magnetization practically runs "synchronously" with the course of voltage. Thus, for all three voltages between the lines, there is synchronism in relation to magnetization in the respective, assigned limbs of the rotary current transformer so that no reactive current peaks can occur.

Figure 10:
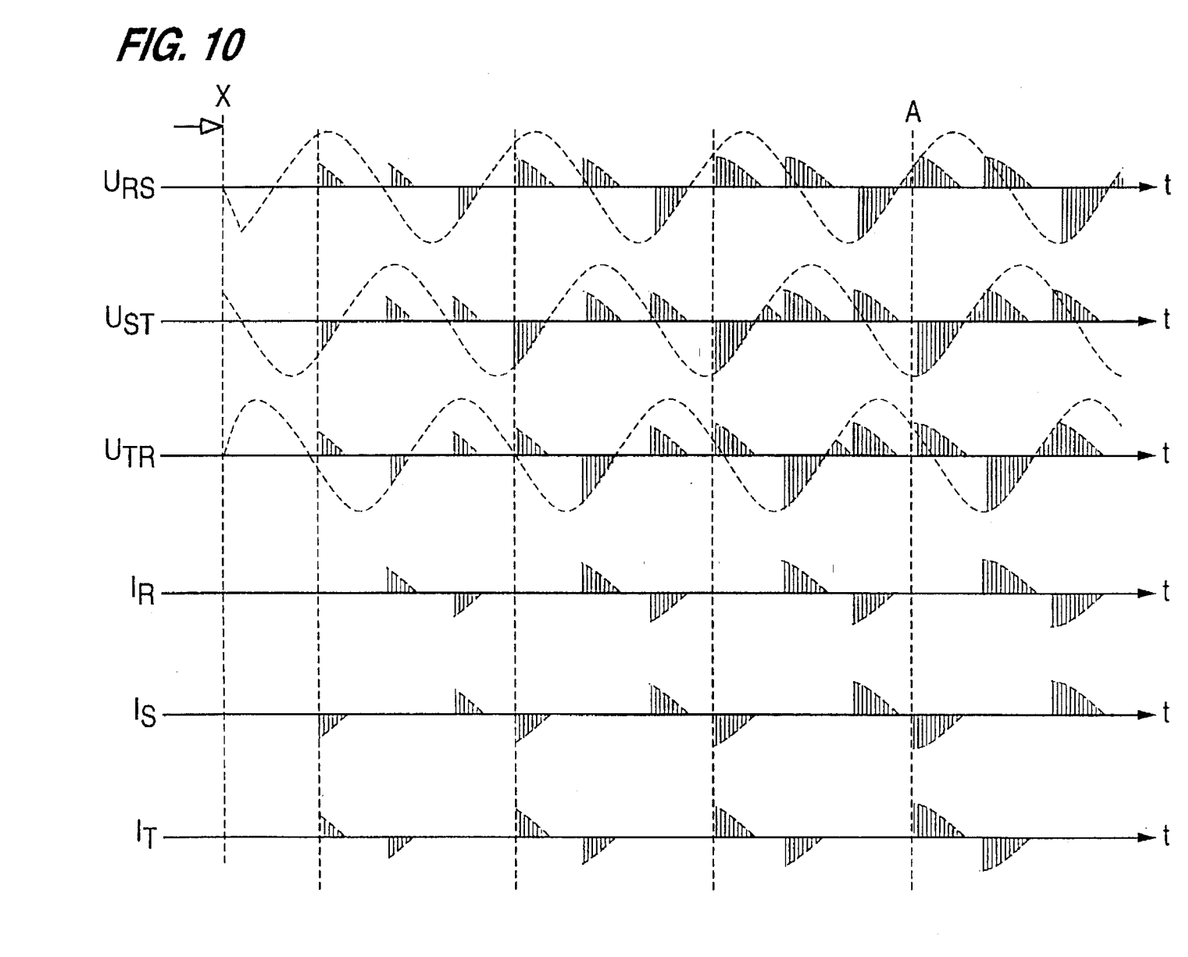
FIG. 10 shows a diagram similar to FIG. 3, however, here of a somewhat altered switch-on process.

As can be seen from FIG. 3, lines 5 and 6, small reactive current peaks occur at the beginning of the premagnetization phase. In order to prevent this, the unipolar voltage sectors can be gradually raised from initially very small voltage-time surfaces to a predetermined width of the voltage halfwave sector. This is shown in the diagram of FIG. 10. It can be clearly seen that reactive current peaks no longer occur during the premagnetization phase. In the depicted preferred embodiment, the voltage sectors start approximately at phase angles of 135° and are gradually raised to 90°. From timepoint A on, approximately identical voltage courses are yielded, like in the diagram of FIG. 3.

Figure 11:
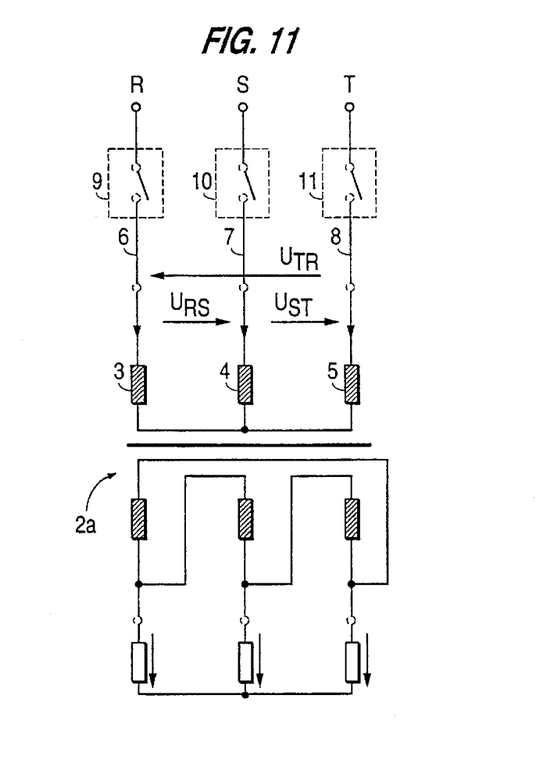
FIG. 11 shows the circuit of a rotary current transformer having a star connection on the primary side and having servo components located in the strand supply lines.
Figure 12:
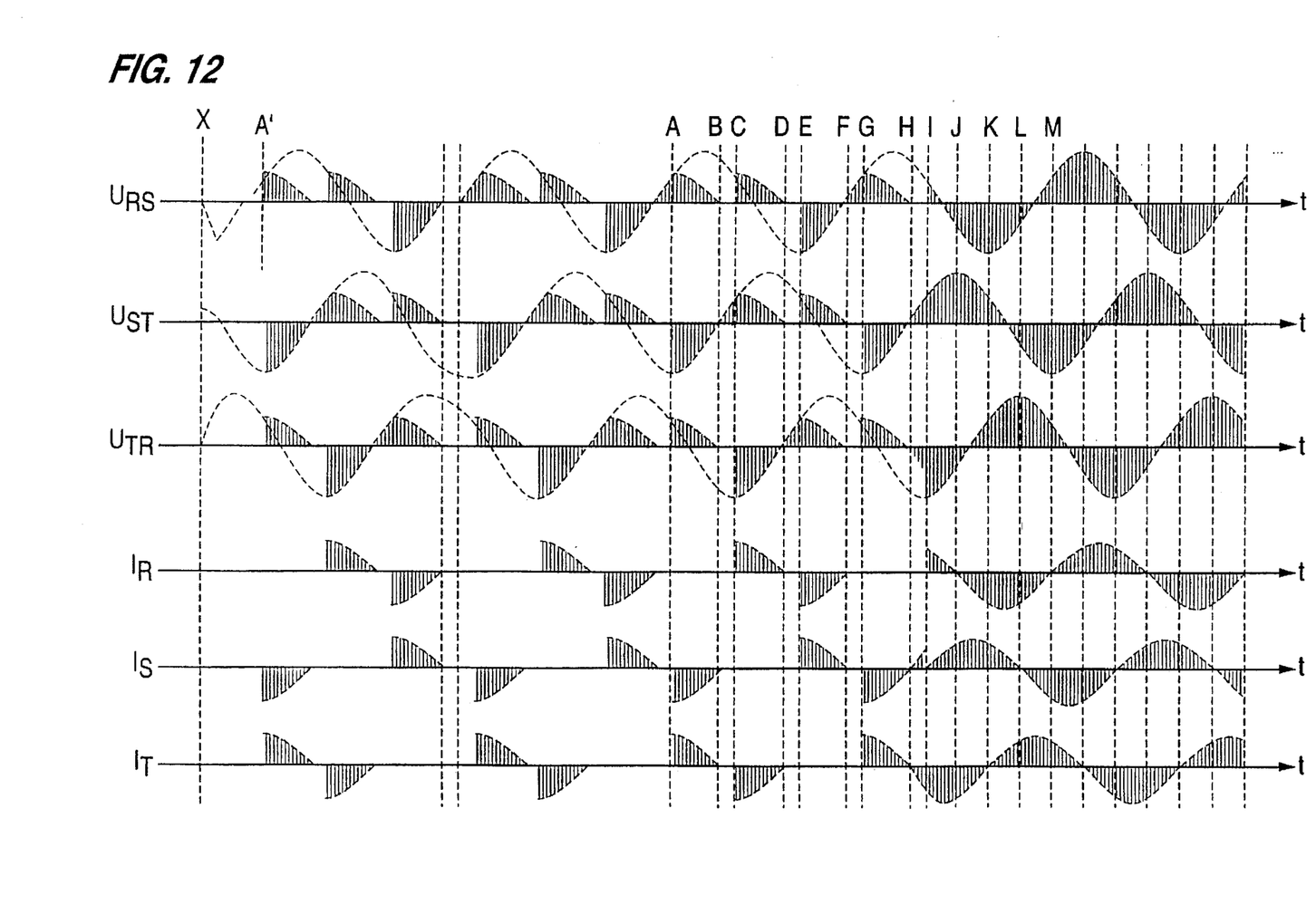
FIG. 12 shows a diagram with a representation of the three voltages between the lines with the respective currents.
Figure 13:
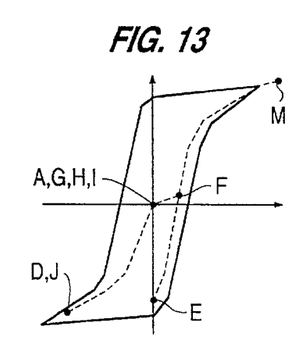
FIGS. 13–15 show the magnetic hysteresis curves for the diagram according to FIG. 12, respectively of the circuit according to FIG. 11.
Figure 14:
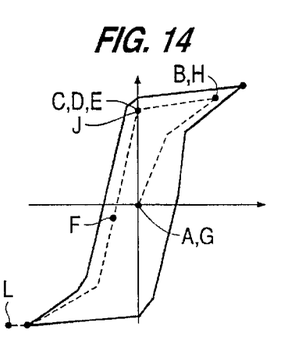
Figure 15:
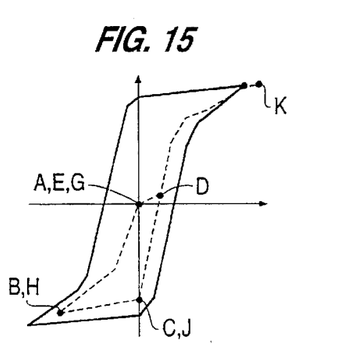
Figure 16:
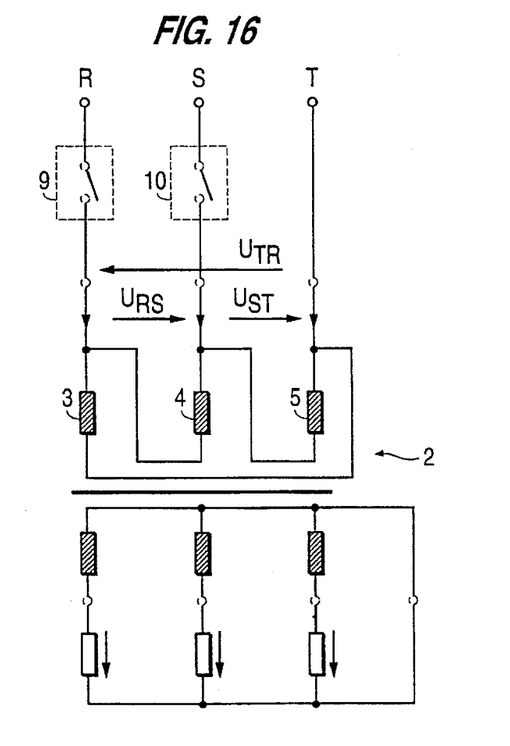
FIG. 16 shows a circuit of a rotary current transformer having a delta connection on the primary side and having servo components located only in two phase supply lines.
Figure 17:
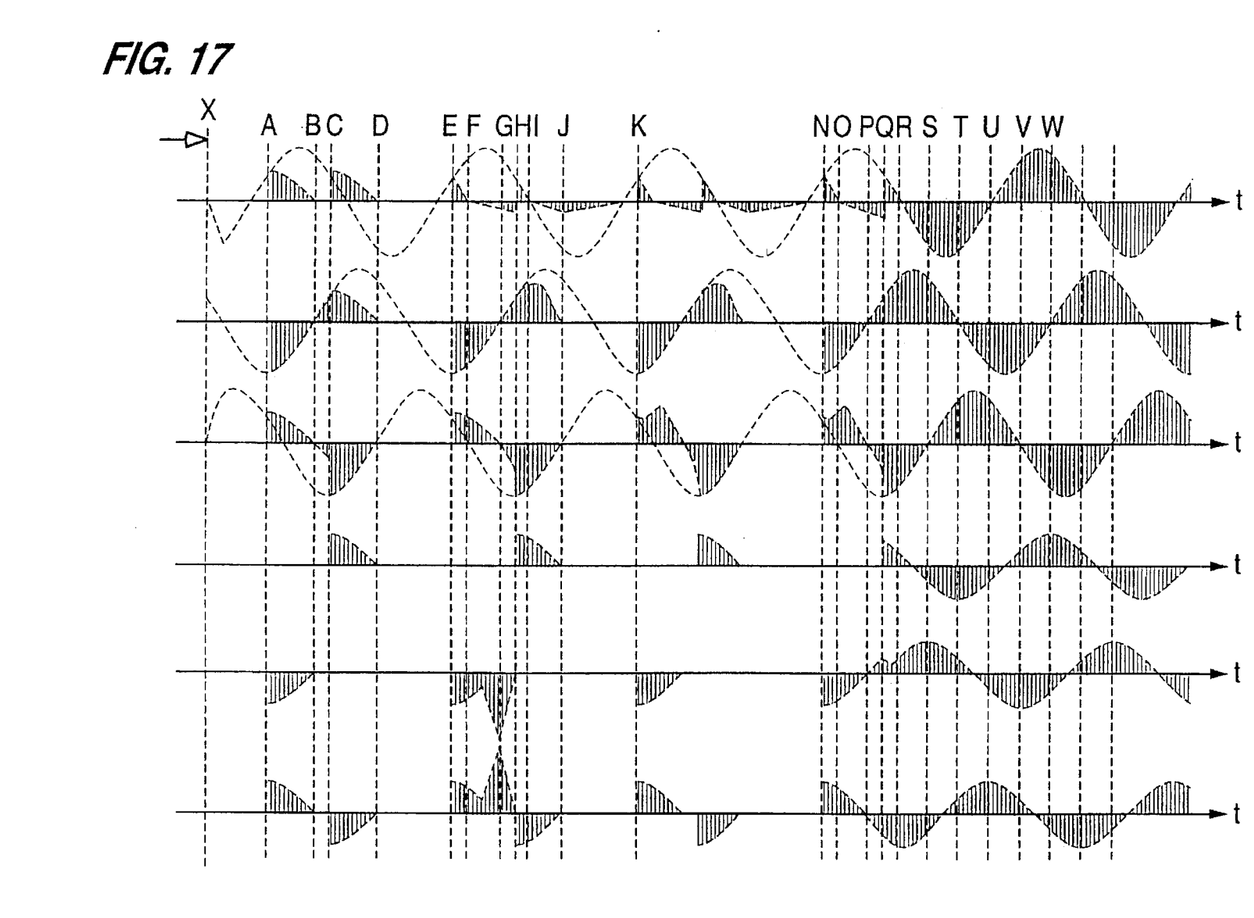
FIG. 17 shows a diagram with the representation of the voltages between the lines and of the respective currents upon switching on a rotary current transformer shown in FIG. 16.

FIG. 11 shows a rotary current transformer 2a whose primary windings are joined to form a star connection and which is connected with its phase conductors 6, 7, 8 via the servo components 9, 10, 11 to the mains phases R, S and T. To this rotary current transformer 2a, too, unipolar, cut voltage halfwaves are always applied in a premagnetization phase. This occurs about comparable to the switch-on process described in FIGS. 1 to 9, however, in this case magnetic fluxes are generated simultaneously in two limbs, because during premagnetization two windings are connected in series to one voltage between the lines. A particularity is that if primary windings are Joined in a star connection in the corresponding limbs of the core, after a time magnetizations set in in all three limbs, which lie in the center, respectively the zero point of the respective hysteresis curve. The reason for this is that balancing processes occur in the iron core via the magnetic resistances of the individual core limbs. Noteably, if the iron of a limb is driven into saturation, its magnetic resistance increases considerably, because the permeability in this limb decreases greatly so that even a partial magnetic flux of the fluxes generated in the two limbs flowing through this limb whose winding has no current flowing through it. FIG. 12 is the timepoint of the mains switch-on marked X. From the timepoint A', the previously mentioned balancing processes can take place. Usually, they have ended approximately after the duration of the length of one period of the last applied phase voltage. A further application of the windings with unipolar, cut voltage halfwaves changes the states of magnetization in the limbs, but now only periodically. At the timepoint A (FIG. 12), all three limbs of the core are at the zero point of the respective hysteresis curve (FIGS. 13–15). The timepoint marked A in FIG. 12 is also marked A in the hysteresis curves. At the timepoint A, the servo components 10 and 11 are made conductive as the voltage between the lines $U_{ST}$ is applied to the transformer. This voltage between the lines drives a current through the windings 4 and 5 so that magnetic fluxes flowing in the opposite direction are generated in the limbs 19 and 20 FIG. 2). As previously described, no magnetic flux is generated in the third limb 3 so that the state of magnetization between timepoints A and C does not change. The magnetic flux in the center limb 19 moves magnetization from point A via point B to the positive off-load remanence C (FIG. 14). Point C lies somewhat below the maximum possible positive remanence, because the voltage at winding 4 is smaller at the apex than in the later permanent operation, because the voltage between the lines divides into equal parts between windings 4 and 5, which are connected in series for the voltage between the lines $U_{ST}$.

The magnetic flux in limb 20 moves the magnetization from the starting point A via point B to point C (FIG. 15). After timepoint B, the servo components 10 and 11 block, and at timepoint C (FIG. 12) servo components 9 and 11 become conductive. At that moment, the voltage between the lines $U_{TR}$ is applied to the transformer. In limbs 18 and 20, this generates magnetic fluxes which flow in opposite directions. In limb 18, the magnetization is moved from the zero point of the hysteresis curve, point A, which has the same position as point C, via point D to point E (FIG. 13). The magnetic flux in limb 20 moves the magnetization from point C via point D to zero point E, which thus also corresponds to timepoint A in its magnetization. At timepoint E (FIG. 12), the servo components 9 and 10 are triggered and conductive, and the voltage between the lines $U_{RS}$ is applied to the transformer 2a. The current flowing through windings 3 and 4 generates different magnetic fluxes in the two corresponding limbs 18 and 19. In limb 18, magnetization is moved from point E (FIG. 13) via point F to point G which then again corresponds to the starting point A, respectively the zero point of the hysteresis curve. In the limb 19, the magnetization is also moved from point C (FIG. 14), which corresponds to the magnetization points D and E (FIG. 14), via the magnetization point F back to the zero point of the hysteresis curve. This point G is thus the same state of magnetization as at the timepoint A. From the previously described, it can be seen that the reverse magnetizations in the individual limbs 18, 19, 20 (FIG. 2) always return cyclically to the respective starting point of the magnetization following the length of one period. At the timepoints A and G therefore the magnetizations of the individual limbs in the examined premagnetization time period are always at the zero points of the hysteresis curve so that there is thereby a defined starting point present for fully switching on the transformer to the mains.

As these defined states of magnetization have recurred several times from the switch-on time point X (FIG. 12) for the more closely examined time period starting at A, one of the corresponding time points for switching to full mains voltage, respectively a predetermined value, lying prior to timepoint A could also be selected. The lines of the diagram of FIG. 12 are drawn with interrupted lines between the timepoints A' and A in order to make it more apparent that practically any period of time could lie therebetween.

From timepoint G (FIG. 12) on, when the magnetizations of the individual limbs are always at the zero point of the hysteresis curves, the servo components 10 and 11 become conductive and thus the voltage between the lines $U_{ST}$ is applied to the windings 4 and 5. In limb 19, magnetization is moved from point G via point H to point I. In limb 20, magnetization is accordingly moved from the center point of the hysteresis curve (FIG. 15) corresponding to the timepoint G via the magnetization H to point I. At timepoint H, the servo components 10 and 11 remain conductive and thus the voltage between the lines $U_{ST}$ remains applied. At the timepoint I, the servo component 9 becomes conductive so that all three voltages between the lines are applied to the transformer. A phase jump occurs in the voltages applied to windings 3, 4, 5. If the servo component 9 becomes conductive at the timepoint I, the magnetization in limb 20 is at point I (FIG. 15). Point I lies somewhat more positive than the maximum possible negative remanent magnetization of limb 20, which is obtained on the hysteresis curve when circulating if the strand voltage is applied to winding 5. As current $I_T$ is proportional to strand voltage $U_T$, it can be deduced from its phase position following the phase jump that the remanence in limb 20 and the phase position of strand voltage $U_t$ do not coincide exactly. Although this drives iron limb 20 at timepoint K (FIG. 15) somewhat to the positive saturation, the accompanying small reactive current peak, however, is insignificant, because it does not attain the value of the nominal load current when the transformer has no load and if the transformer does have a load, it practically disappears behind the active current. Following timepoint K and the corresponding magnetization state K, magnetization runs synchronously back and forth between the two points of reversal of the hysteresis curve. The situation is similar in limb 19 where at timepoint I, magnetization accordingly is also at point I and is driven by strand voltage $U_S$ somewhat toward the negative saturation. In limb 18, magnetization is moved from the zero point of the hysteresis curve, respectively point I via point J to magnetization point M which lies slightly in saturation. From this timepoint M on, respectively magnetization point M, magnetization runs back and forth between respective points of reversal of the hysteresis curve. Thus at the timepoint M, the transition from the premagnetization phase to full switching on of the transformer is fulfilled.

Tests show that the previously mentioned, small reactive peaks could still be prevented by adjusting the phase cut angle of the voltage between the lines $U_{TR}$ separately. As these reactive current peaks, however, do not interfere even under different operational conditions, such measures are obviated.

Figure 18:
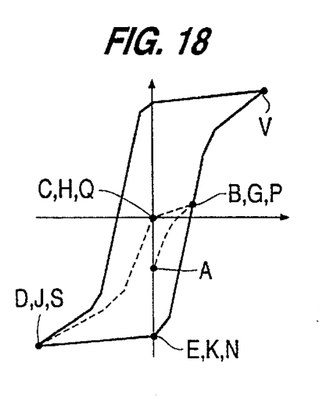
FIG. 18–20 show the the magnetization hysteresis curves for FIGS. 16 and 17.
Figures 19, 20:
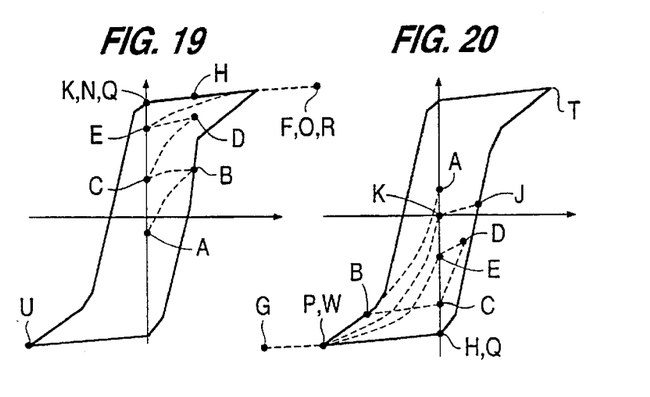

FIGS. 16 to 20 show another, simplified switch on-process in conjunction with a rotary current transformer 2 having windings connected to form a delta on the primary side. In this simplified switch-on process, Just two servo components 9 and 10 which are connected in the phases R and S suffice. Phase T is directly connected to the transformer. In this case, only the two voltages between the lines $U_{ST}$ and $U_{TR}$ are connected to the transformer with unipolar and approximately 90° cut halfwaves during the premagnetization phase (timepoints A to N in FIG. 17). First the servo component 10 becomes conductive at timepoint A. The current flowing through winding 5 generates a magnetic flux in limb 20 so that magnetization from point A is moved via point B to point C. The magnetization points within the hysteresis curves correspond in each case to the time points bearing the same letters in the diagram of FIG. 17. The hystersis curves of FIGS. 18, 19 and 20 are assigned to the limbs 18, 19 and 20 (FIG. 2).

In the two other limbs 18 and 19, there is also a reversal in magnetization from points A to points C in each case via points B. This is generated by magnetic partial fluxes in these limbs, originating from the magnetic flux in limb 20. The respective magnetic fluxes originating from the in series connected windings 3 and 4, set each other off.

After servo component 10 has locked after timepoint B, servo component 9 becomes conductive at timepoint C so that voltage between the lines $U_{TR}$ then is applied to the transformer. The current flowing through winding 3 leads to a magnetic flux in limb 18 of the transformer and thereby a reversal in magnetization at point D and a remanent magnetization at point E (FIG. 18). The resulting magnetic partial fluxes lead to a change in magnetization from point C via point D to point E (cf. FIGS. 19 and 20) in limbs 19 and 20.

An time point E (FIG. 17) servo component 10 becomes conductive again so that voltages between the lines $U_{ST}$ is applied again. The current flowing through winding 5 leads to a magnetic flux in limb 20 and thereby the magnetization moves from point E via point G to point H. FIG. 20 shows that point G lies in the saturation region so that a reactive current peak occurs at timepoint G (cf. FIGS. 17, 5th and 6th diagram lines). The magnetic flux in limb 20 does not divide symmetrically onto the two limbs 18 and 19, because magnetization in the center limb 19 reaches saturation (cf. point F in FIG. 19) and, therefore, the magnetic resistance increases. A larger part of the divided magnetic flux from limb 20 flows, therefore, through limb 18. Until timepoint H, magnetization in limb 18 moves via point G to point H. At timepoint H, magnetization in the center limb 19 also corresponds to point H. At timepoint H, servo component 9 becomes conductive again and the generated flux in limb 18 moves the magnetization via the negative point of reversal J of the hysteresis curve to point K, which once more corresponds to the remanence of limb 18 at timepoint E.

As in limb 19 the high remanence results in higher magnetic resistance, the magnetic flux flowing in limb 18 divides in such a manner that the partial flux flowing through limb 19 is only so large that the high magnetic resistance is maintained, with the remanence assuming the maximum positive value at point K at timepoint K (FIG. 19). The other magnetic partial flux moves magnetization from point H via point J to point K (the zero point of the hysteresis curve of FIG. 20). At the timepoint K, the states of magnetization are, therefore, in defined starting positions in the limbs 18, 19, 20, notably in limb 18 in the point of maximum negative remanence, in limb 19 in the point of maximum positive remanence and in limb 20 in the zero point of the hysteresis curve. On the basis of this magnetization, the full mains voltage of all three phases can then be connected to the rotary current transformer as described in the following.

From timepoint K on, the remanence in the two outer limbs 18 and 20 can also be moved back and forth selectively between the maximum negative remanence and the zero point of the hysteresis curve by selective switching on the servo components 10 or 9. In this way, the maximum positive remanence is maintained in the center limb 19.

At timepoint N, servo component 10 becomes conductive so that magnetization in limb 20 wanders from the hysteresis zero point to timepoint P in the negative point of reversal P of the hysteresis curve (FIG. 20) and from there to point Q. In the center limb 19, magnetization is driven from the point of maximum positive remanence somewhat to the iron saturation point O and from there back again to the starting point at maximum positive remanence. In limb 18, magnetic remanence is moved from the point of maximum negative remanence to the zero point of the hysteresis curve.

After timepoint P (FIG. 17), servo component 10 remains conductive so that magnetization reaches via point Q to the positive point of reversal T. The other voltage halfwaves then cause the magnetization to run back and forth between the points of reversal of the hysteresis curve. At timepoint Q, servo component 9 becomes conductive so that from this timepoint all three voltages between the lines are applied to transformer 2. The magnetic flux in limb 18 moves the magnetization to the negative point of reversal S of the hysteresis curve. The magnetization point corresponds to the timepoint S in FIG. 17 and, therefore, crossover of the voltage between the lines $U_{TR}$. The magnetization in limb 18 then wanders through the next positive halfwave to the positive point of reversal V and with the succeeding halfwaves then back and forth between the points of reversal of the hysteresis curve.

At time point Q, the magnetization in the center limb 19 is in maximum positive remanence. The positive voltage phase of the voltage between the lines $U_{RS}$ moves the magnetization from point Q to point R (FIG. 19). The magnetic reversal of the center limb 19 then runs back and forth synchronously to the other voltage halfwaves between the points of reversal R and U. The shift in the current courses of the conductor currents $I_R$, $I_S$ and $I_T$ at timepoint R occurs, because the currents $I_R$, $I_S$, $I_T$ no longer correspond to the strand currents through the windings as is the case during the premagnetization phase, but rather become conductor currents forming from the sum of two strand currents. In this switch-on process, too, the voltage time surface of the here negative voltage halfwaves can gradually increase from the switch-on point X to, by way of illustration, a phase angle of 90° in order to prevent the otherwise occurring reactive current peaks (cf. timepoint G in FIG. 17). The afore-described switch-on process may be used both in rotary current transformers having a load connected to the secondary side as well as in transformers with no-load on the secondary side.

What is claimed is:

1. A method for reduction of switch-on surges while operating an inductive rotary current load having a magnetizable core having core sectors allocated to three windings arranged in different connections on a rotary current alternating network, with a phase angle control unit which provides at least a temporary phase operation of voltages between the lines of the windings, said method comprising the steps of:

bringing said core sectors to a predetermined state of magnetization, at least two of three voltages between the lines of the windings having unipolar voltage halfwaves reduced to at least half their voltage-time surface being connected successively to said rotary current load according to a present phase shift of said voltages between the lines, and after at least the duration of a length of one period of the last applied voltage between the lines, one of said three voltages having an effective value raised to one desired value or up to a nominal value of a main voltage remaining switched on and then the other two phases also having a raised effective value being switched on in sequence.

2. A method according to claim 1, wherein said unipolar voltage halfwaves reduced to at least half their voltage-time surface being reduced in one sector corresponding to a phase angle of approximately 135° to approximately 90° with approximately a sinusiodal main voltage.

3. A method according to claim 1, wherein said three core sectors being magnetized in a same-direction, respectively rectified, magnetic flux in at least two of said core sectors.

4. A method according to claim 1, wherein, said windings are delta-connected windings arranged side by side on an iron core, having current flowing through successively first the windings arranged on outer limbs of said core and then the winding arranged on a center limb.

5. A method according to claim 1, wherein effective voltages applied to the windings during the premagnetization phase being increased from a switch-on timepoint to an effective voltage corresponding to unipolar voltage halfwaves cut at approximately 90°.

6. A method according to claim 1, wherein, said windings are delta-connected windings arranged side by side on an iron core, outer windings being successively applied with respective voltages between the lines having homopolar, unipolar voltage halfwaves reduced to half their voltage-time surface, and after the duration of at least a length of one period of the last applied voltage between the lines, one of the two voltages between the lines remaining switched on following one of these voltage halfwaves having a reduced effective value, respectively of a reduced current flow angle, and the other two voltages between the lines also having a reduced current flow angle, respectively, a reduced effective value being switched on successively.

7. A method according to claim 1, wherein, in the case of windings selectively delta-connected or star-connected on the primary side, all three voltages between the lines being connected successively and corresponding to a present phase shift unipolar and having a reduced effective value to their respective, allocated windings for premagnetization of the core, and subsequently, after a duration of at least the length of one period of the last applied voltage between the lines, one voltage between the lines remaining switched on following one of said voltage halfwaves having a reduced effective value, respectively of a reduced current flow angle, and the other two voltages between the lines being switched on successively also with a reduced current flow angle, respectively of a reduced effective value.

8. A method according to claim 1 wherein in the case of said winding connected on the primary side to form a star having a center point line, all three windings being connected successively to the respective strand voltage between a phase and said center point line for premagnetization of the core.

9. An apparatus for reduction of a switch-on current surge of an inductive rotary current load having a magnetizable core operated as a rotary current transformer, said apparatus comprising: servo components comprising alternating current switches connected to a phase angle control in the phase branches for carrying out a method according to any one of claims 1 to 8, wherein said servo components being provided in at least two phase branches and said servo components being connected like said phase angle control to a sequence control for switching on and off said servo components during premagnetization of the core sectors to predetermined values as well as for subsequent consistent switching on said servo components and for triggering said phase angle control in the sense of changing of the phase angle from approximately 135° to approximately 90° during the premagnetization to smaller phase angles in the directly following phase of operation.

10. An apparatus according to claim 9, wherein said sequence control being designed with preferably a steadily increasing current flow angle, respectively a decreasing phase angle to a setable end value from approximately a 135° to approximately 90° phase angle for connecting said inductive rotary current load to the rotary current alternating network from a switch-on moment.

11. An apparatus according to claim 9, further comprising by a detection device having a sequence control for temporally staggered flowing of current during the individual phases in dependence of the allocation of the servo components to the respective windings and voltages between the lines.

12. An apparatus according to claim 9, wherein said servo components being provided with mechanical contacts as well as semiconductor switches which can be bridged by said contacts.

* * * * *